United States Patent

Nakajima et al.

Patent Number: 5,157,502
Date of Patent: Oct. 20, 1992

[54] SOLID-STATE IMAGING DEVICE WITH CONTINUOUSLY ADJUSTED DISCHARGING IN THE HIGH SHUTTER SPEED RANGE

[75] Inventors: Takatsugu Nakajima, Tokyo; Yuji Kokubo, Kanagawa, both of Japan

[73] Assignee: Sony Corporation, Tokyo, Japan

[21] Appl. No.: 755,526

[22] Filed: Sep. 5, 1991

[30] Foreign Application Priority Data

Sep. 11, 1990 [JP] Japan .................................. 2-238930

[51] Int. Cl.$^5$ ........................................... H04N 5/335
[52] U.S. Cl. ............................ 358/213.19; 358/213.11; 358/213.13
[58] Field of Search ....................... 358/213.13, 213.19, 358/228, 209, 909; 250/205

[56] References Cited

U.S. PATENT DOCUMENTS

| | | | |
|---|---|---|---|
| 4,839,734 | 6/1989 | Takemura | 358/213.22 |
| 4,843,474 | 6/1989 | Suzuki | 358/213.19 |
| 4,851,916 | 6/1989 | Pinson et al. | 358/213.19 |
| 4,881,127 | 11/1989 | Isoguchi et al. | 358/213.19 |
| 4,984,002 | 1/1991 | Kokubo | 358/213.13 |
| 5,031,048 | 7/1991 | Naruto et al. | 358/213.19 |
| 5,057,926 | 10/1991 | Watanabe | 358/213.11 |

FOREIGN PATENT DOCUMENTS 59-122288 7/1984 Japan .
63-82067 12/1988 Japan .

Primary Examiner—Michael Razavi
Assistant Examiner—Tuan V. Ho
Attorney, Agent, or Firm—Alvin Sinderbrand; William S. Frommer

[57] ABSTRACT

A solid-state imaging apparatus functioning as an electronic shutter accumulates charge, is discharged during the horizontal blanking periods and provides charge accumulated since the last discharge as an image output signal in response to an image output pulse. When the level of the image output signal corresponds to a dark object, the charge accumulation time is controlled to be relatively long, so that a charge accumulation period timing resolution of one horizontal period is sufficient. When the level of the image output signal corresponds to a light object, the charge accumulation time is controlled to be relatively short with more accurate timing resolution than for a dark object by continuously controlling the discharge timing defining the start of the charge accumulation period.

2 Claims, 5 Drawing Sheets

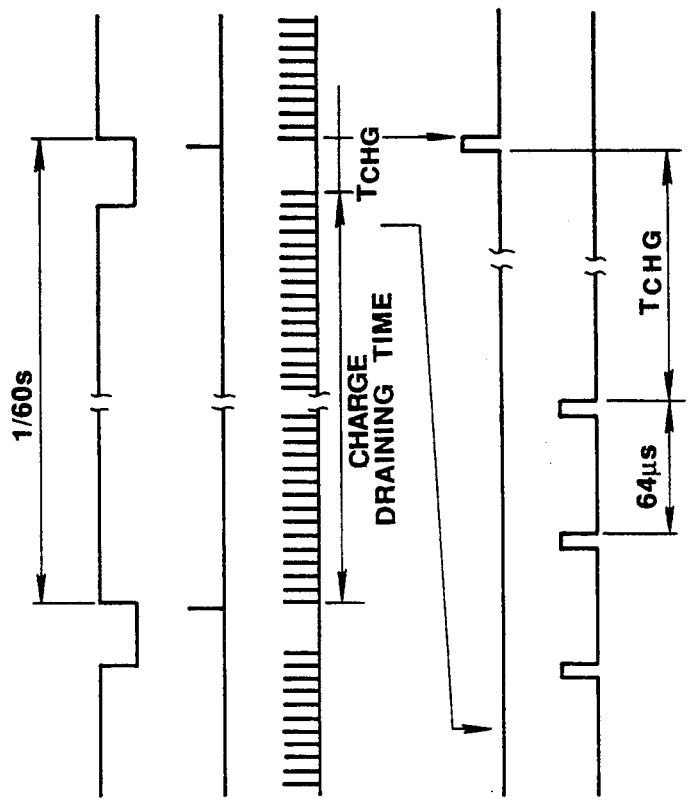

SOLID-STATE IMAGING DEVICE WITH CONTINUOUSLY ADJUSTED DISCHARGING IN THE HIGH SHUTTER SPEED RANGE

BACKGROUND OF THE INVENTION

1. Field of the Invention

This invention relates to a solid-state imaging device for imaging an object. More particularly, it relates to a solid-state producing an image signal of device in which adjustment of light exposure may be made automatically.

2. Description of Related Art

In a video camera, for example, there is known, as a mechanism for automatically adjusting the volume of light received by a so-called CCD image sensor constituted by photoelectric converting elements as solid-state imaging elements and charge-coupled devices, a mechanism for automatically adjusting a so-called iris enclosed in a lens part of the camera, referred to hereinafter as an auto-iris mechanism, as disclosed in, for example, JP Patent Publication Kokai No. 63-82067 (1988).

Referring to FIG. 5, the video camera is constituted by a lens part 50 and a main body of the video camera 60.

The lens part 50 is constituted by a lens 51, an iris 51, a detection circuit 53 for detecting the level of imaging signals transmitted from the main body of the video camera 60, a comparator circuit 54 for comparing an output of the detecting circuit 53 with a reference voltage, and an iris driving circuit 55 for controlling the opening and closure of the iris 52 based on an output of the comparator circuit 54.

The main body of the video camera 60 is constituted by a CCD image sensor 61, made up of solid-state imaging devices, an amplifier 62 for amplifying imaging signals from the CCD image sensor 61, an automatic gain control circuit (AGC circuit) 63 for processing the amplified imaging signals from the amplifier 62 by automatic gain control, and a signal processing circuit 64 for converting the imaging signals from the AGC circuit 63 into video signals conforming to the NTSC or PAL system.

The auto-iris mechanism is so constructed that an output level of the CCD image sensor 61 accommodated in the main body of the video camera 60 is fed back to the iris 52 accommodated in the lens part 50.

That is, the opening and closure of the iris 52 is adjusted automatically so that an output level of the CCD image sensor 61, obtained by means of the amplifier 62 and the detection circuit 53, will be the reference voltage or so that the output of the comparator circuit 54 will be equal to zero.

On the other hand, as a light exposure adjustment mechanism not making use of an iris, there is also known a mechanism in which the charge accumulation time of a so-called charge accumulating type CCD image sensor is controlled, referred to hereinafter as an electronic shutter.

More specifically, with the field accumulation type CCD image sensor having the function of the electronic shutter, an image readout high-level pulse SG shown in FIG. 6B is issued when a low level signal indicating a vertical blanking period as shown in FIG. 6A, referred to hereinafter as a vertical blanking signal, is supplied, and charges accumulated since the issuance of the image readout pulse SG for a given field until issuance of the image readout pulse for the next field are read out on the basis of the image readout pulse SG of the next field.

Referring to the function of the electronic shutter, high-level reset pulses SUB are supplied to a substrate of the CCD image sensor during the horizontal scanning period since the time of issuance of the image readout pulse SG of a given field, as shown at FIG. 6C, to drain off the charges accumulated until then, and the time period since the issuance of the last reset pulse SUB until the issuance of the image readout pulse SG of the next field is controlled to control the charge accumulating time $T_{CHG}$. In the NTSC system, for example, the maximum charge accumulating time $T_{CHG}$ is 16.7 ms as determined by the field frequency, whereas, in the PAL system, the maximum charge accumulating time $T_{CHG}$ is 20 ms as determined by the field frequency.

Meanwhile, in an industrial video camera, for example, a number of exchange lenses by the so-called C-mount system are used, such that the main body of the video camera may be used in combination with freely selected lenses. However, with an auto iris lens system making use of the above mentioned auto iris mechanism, various problems are presented in connection with interfacing between the lens system and the main body of the video camera. These problems include that associated with interchangeability of a connector interconnecting the auto iris lens system and the main body of the video camera and that associated with the matching of the standards for the feedback signal level, current capacity and the source voltage supplied from the main body of the camera to the auto iris lens system.

Also, since the detection circuit 53, the comparator circuit 54 etc. are accommodated in the lens part 50, as shown in FIG. 5, it is necessary to adjust the reference voltage etc. in the lens part 50 each time the lens part 50 is exchanged to provide for optimum light exposure.

On the other hand, the auto iris lens system is generally expensive and involves complicated cable connection as compared with a manual iris lens system in which the iris is adjusted manually.

In addition, in the adjustment of the light exposure time making use of the above mentioned electronic shutter, the reset pulses sub draining the accumulated charges need to be applied during the horizontal blanking period to prevent any adverse effects on the currently read out imaging signals. For this reason, the charge accumulating time $T_{CHG}$ is controlled with the 1 H time period, that is, 64 μs, corresponding to a period of the horizontal scanning period, as a unit. Therefore, while no problem exists with 1 H timing resolution control of the charge accumulating time $T_{CHG}$ for a lower shutter speed range corresponding to a dark object, the 1 H timing resolution control is too coarse for practical use for a higher shutter speed range corresponding to a bright object.

Object and Summary of the Invention

In view of the above mentioned status of the art, it is a principal object of the present invention to provide a solid state imaging apparatus in which automatic light exposure adjustment may be achieved by an inexpensive manual iris lens. It is another object of the present invention to provide a solid state imaging apparatus in which connection between the lens system and the main body of the video camera may be dispensed with.

According to the present invention, there is provided an imaging apparatus comprising an imaging device for accumulating charge, discharging the accumulated charge in response to a discharge pulse, and producing an image output signal in response to an image output pulse; means for generating a voltage level based on the image output signal; and a shutter speed controlling circuit including: means for receiving a vertical scanning timing signal, means for receiving a reset pulse based on a horizontal scanning timing signal, means for receiving a vertical blanking pulse, means for generating a serrated pulse in response to the vertical scanning timing signal, means for generating a timing pulse by comparing the voltage level based on the image output signal of the imaging device with the serrated pulse, and means for generating the discharge pulse in response to the reset pulse, the vertical blanking pulse and the timing pulse so that a discharge of the imaging device is triggered by the reset pulse when a completion of the timing pulse occurs outside of a duration of the vertical blanking pulse, and so that timing of the discharge is adjusted continuously when the completion of the timing pulse occurs within the duration of the vertical blanking pulse.

According to the present invention, the charge accumulation time may be adjusted finely, that is, continuously, in the high shutter speed range in which adjustement of the charge accumulation time using a timing resolution of 1 H period is not practically useful, so that the effects comparable to those of opening or closing the iris may be produced. In other words, the function of automatic light exposure adjustment may be realized using an inexpensive manual iris lens, while cable connection between the main body of the video camera and the lens unit may be eliminated. Since optimum light exposure may be preset on the main body of the video camera, re-adjustment of light exposure need not be performed each time the exchange lens is exchanged.

BRIEF DESCRIPTION OF THE DRAWINGS

FIGS. 6A-6E show timing charts of various signals for illustrating the control of the charge accumulation time of a conventional CCD image sensor.

DESCRIPTION OF PREFERRED EMBODIMENTS

Figure 1:
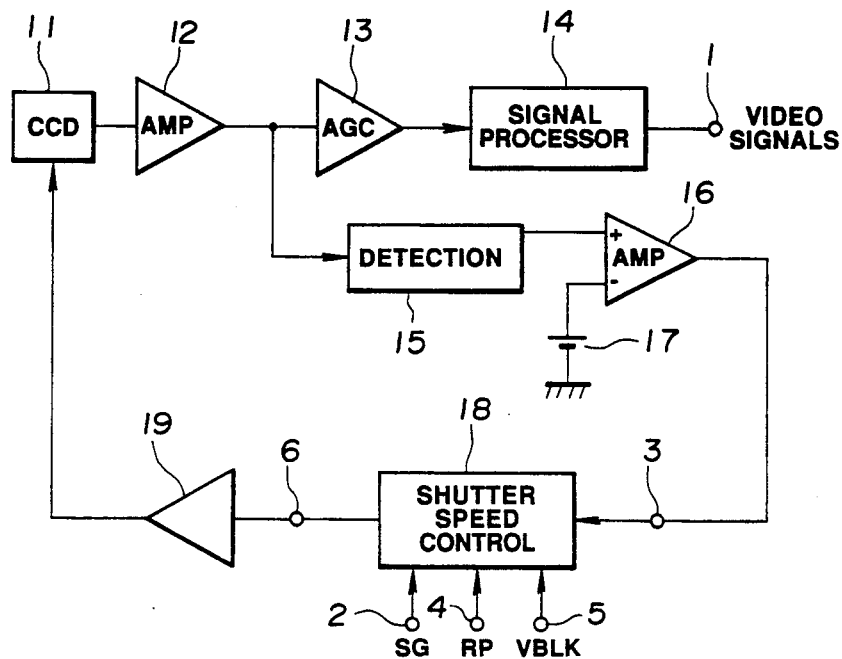
FIG. 1 is a block circuit diagram of a video camera making use of a solid state imaging apparatus according to a first embodiment of the present invention.

By referring to the drawings, preferred embodiments of a solid-state imaging apparatus according to the present invention will be explained in detail. FIG. 1 shows, in a block circuit diagram, a video camera making use of a solid-state imaging apparatus according to a first embodiment of the present invention.

Referring to FIG. 1, the video camera includes a solid-state imaging device 11 having a controllable charge accumulation time, a signal processing circuit 14 for converting the imaging signals from the solid-state imaging device 11 into video signals conforming to, for example, the NTSC system or the PAL system, a detection circuit 15 for detecting an output level of the solid-state imaging device 11, and a shutter speed controlling circuit 18 for controlling the charge accumulation time in the solid-state imaging device 11 based on an output from the detection circuit 15.

As the solid-state imaging device 11, a so-called field accumulation type CCD image sensor is used, which is made up of a matrix array of photoelectric converting elements and in which the charges accumulated in these converting elements are read out using charge-coupled devices. The solid-state imaging device 11 is designed so that a high level pulse is supplied to the substrate during a horizontal blanking period to drain the accumulated charges and so that the charge accumulation time may be controlled from outside. That is, a CCD image sensor having the function of a so-called electronic shutter is used as the solid-state imaging device. The imaging signals from the solid-state imaging device 11 are amplified by amplifier 12 and thence supplied to AGC circuit 13 for automatic gain control. The imaging signals from the AGC circuit are transmitted to signal processing circuit 14 so as to be converted into image signals conforming to, for example, the NTSC or PAL system. These image signals are outputted at output terminal 1.

The detection circuit 15 is adapted for detecting an output level of the solid-state imaging device 11 by e.g. peak or mean value detection of imaging signals supplied from the imaging device 11 via amplifier 12. The circuit 15 detects the level of the imaging signals with addition of so-called weighting and with the imaging signals of the entire image or at the middle of the image as the object of detection. The output of the detection circuit 15 is supplied to a differential amplifier 16.

The differential amplifier 16 compares the output level of the imaging device 11 detected by the detection circuit 15 with the reference voltage supplied from reference voltage generator 17 to supply a difference as a shutter control voltage to the shutter speed controlling circuit 18.

The shutter speed controlling circuit 18 transmits discharge pulses SUB to the imaging device 11 via driver circuit 19 based on the shutter control voltage from the differential amplifier 16 to control the charge accumulation time of the solid-state imaging device 11 so that the shutter control voltage from the differential amplifier 16 will be zero, as described previously.

The construction of the shutter speed controlling circuit 18 is hereinafter explained.

Figure 2:
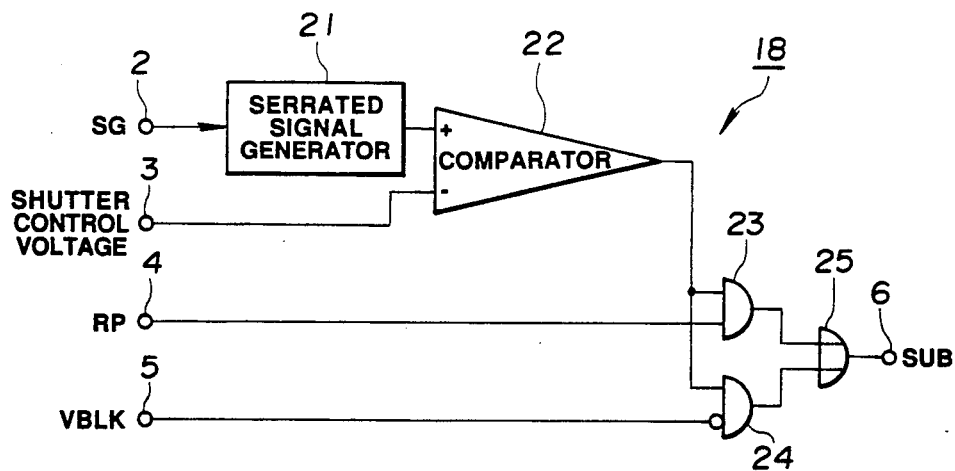
FIG. 2 is a schematic view showing a shutter speed control circuit of the video camera shown in FIG. 1.

Referring to FIG. 2, the shutter speed controlling circuit 18 is constituted by a serrated wave generator 21, adapted for generating serrated signals timed to the image readout pulse supplied via terminal 2, a comparator 22 for comparing the serrated signals from the serrated signal generator 21 to the shutter control voltage, an AND gate 23 for gating a reset pulse RP supplied via terminal 4 based on the output from comparator 22, and AND gate 24 for gating the negative logic of the vertical blanking signal $V_{BLK}$ supplied via terminal 5 based on the output from comparator 22, and an OR gate 25 for taking an OR of the output of the AND gate 23 and the output of the AND gate 24. The output of the OR gate 25 is supplied to terminal 6 as the discharge pulse SUB for the solid-state imaging device 11. The terminals 2 to 6 correspond to terminals 2 to 6 shown in FIG. 1.

The operation of the shutter speed controlling circuit 18 is hereinafter explained.

Referring to FIG. 3B, the output of the serrated signal generator 21 is the serrated signal timed to the image readout pulse SG for the solid-state imaging device 11 shown in FIG. 1. The output of comparator 22 goes high when the level of the serrated signal is lower than the shutter controlling voltage, as shown in FIG. 3C. Thus the width of the high level of the output from comparator 22 is controlled continuously, that is, in an analog fashion, by the shutter control voltage, such that the width becomes wider when the object is lighter and the shutter control voltage becomes higher.

Figure 3:
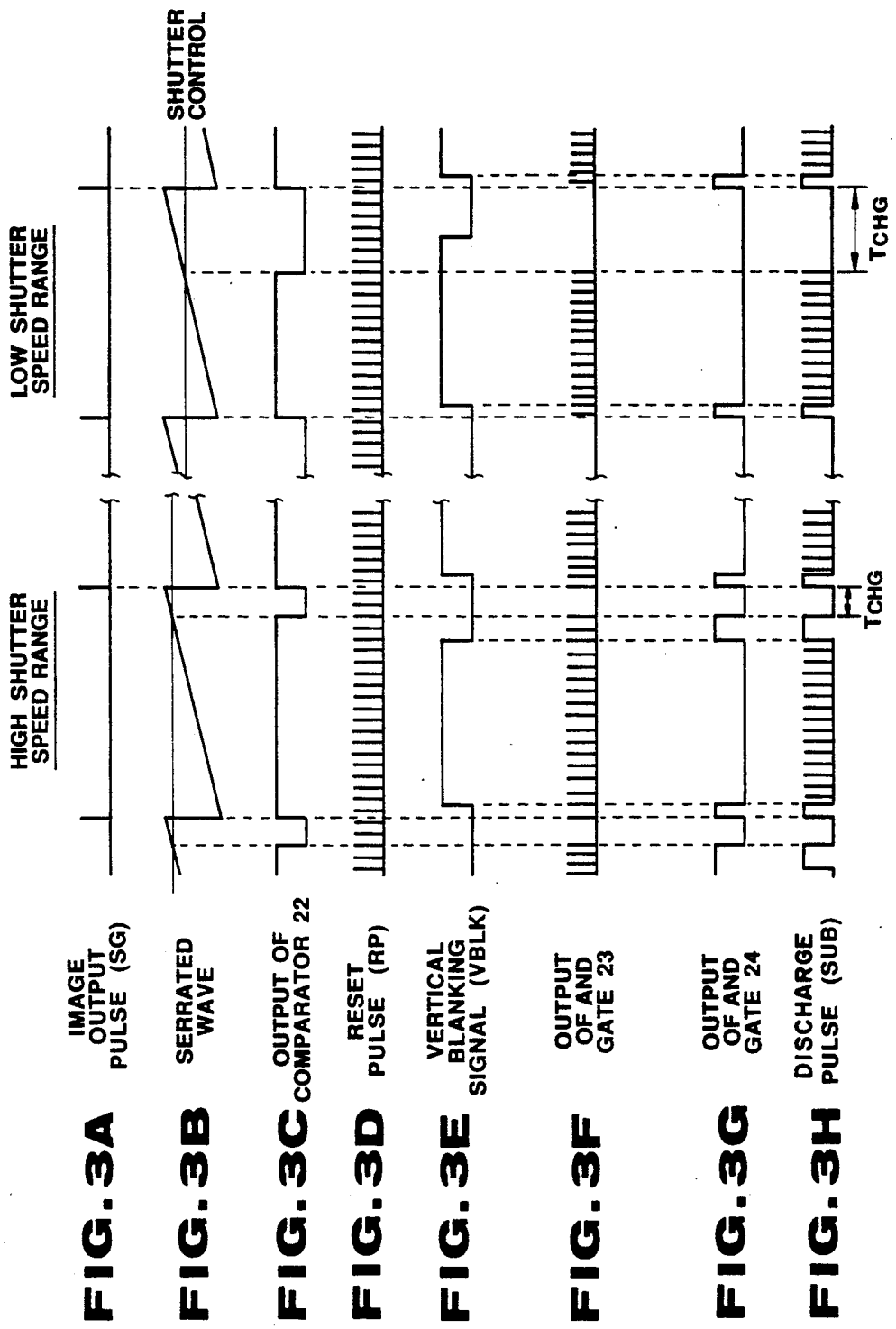
FIGS. 3A-3H show timing charts of various signals appearing at critical portions of the shutter speed control circuit shown in FIG. 2.

Referring to FIG. 3D, the reset pulse RP supplied via terminal 4 is timed to the horizontal synchronizing signal and goes high during the horizontal blanking period so as not to affect the currently read out imaging signal, as explained previously. The AND gate 23 allows the reset pulse RP to pass therethrough when the output of comparator 22 is at a high level to output a signal shown at F in FIG. 3. The AND gate 24 allows the negative logic of the vertical blanking signal $V_{BLK}$, shown at E in FIG. 3, supplied via terminal 5, to pass therethrough, when the output of comparator 22 is at a high level, to output a signal shown at G in FIG. 3. Thus the OR gate 25 outputs the reset the discharge pulse RP as the discharge pulse SUB, as shown at H in FIG. 3, during the period when the output of the comparator 22 is at high level, as long as the shutter control voltage is low and the high-level period of the output of comparator 22 is shorter than the high-level period of the vertical blanking period $V_{BLK}$, that is during the so-called imaging period. This state is referred to hereinafter as the low shutter speed range. Thus, for the low shutter speed range, the OR gate 25 outputs the discharge pulse SUB controlled with the 1 H period as a unit. On the other hand, the OR gate 25 outputs the reset pulse RP during the imaging period when the shutter control voltage is high and the high-level period of the output of the comparator 22 is longer than the imaging period, as shown at H in FIG. 3. This state is referred to hereinafter as the high shutter speed range. During the vertical blanking period, the OR gate 25 outputs high-level discharge pulse SUB during the period when the output of comparator 22 is at a high level. Thus the OR gate 25 outputs continuously controlled discharge pulse SUB for the high shutter speed range.

Thus, in the low shutter speed range when the object is dark and the output level of the solid-state imaging device 11 is detected to be low at the detection circuit 15, the shutter speed controlling circuit 18 transmits discharge pulses SUB, which are controlled during the imaging period with the 1 H period as a unit on the basis of the output level of the solid-state imaging device 11, to the substrate of the imaging device 11 via driver 19, for controlling the charge accumulating time $T_{CHG}$, which is the period since the supply of the last discharge pulse SUB until supply of the image readout pulse SG, with the 1 H period as a unit, as shown in FIG. 3F. On the other hand, in the high shutter speed range in which the object is light and the output level of the imaging device 11 is detected to be high at the detection circuit 15, the shutter speed controlling circuit 18 supplies discharge pulses SUB, which are continuously controlled on the basis of the output level of the imaging device 11 during the vertical blanking period, to the substrate of the solid-state imaging device 11 via driver 19, for continuously controlling the charge accumulation time $T_{CHG}$, which is the period since the issuance of the last discharge pulse SUB until the issuance of the image readout pulse SG.

In this manner, the imaging signals from the solid-state imaging device 11 controlled as to the charge accumulating time, that is the imaging signals automatically controlled as to light exposure as a function of lightness of the object, are converted into video signals conforming to the NTSC or PAL system, as shown in FIG. 1, before being outputted at the terminal 1. Meanwhile, the rise time of the serrated signal may be changed on the field-by-field basis, so that the charge accumulation time will be equal from field to field, thereby to prevent flicker in the high shutter speed range.

The above described video camera making use of the solidstate imaging apparatus of the present invention includes the solid-state imaging device 11, the charge accumulating time of which may be controlled by discharge pulses SUB supplied thereto, the detecting circuit 15 for detecting the output level of the imaging device 11, and the shutter speed controlling circuit 18 for controlling the charge accumulating time in the imaging device 11 based on the output of the detection circuit 15, and which is adapted for controlling the charge accumulating time in the imaging device 11 with the 1 H period as a unit in the low shutter speed range in which the object is dark and the output level of the imaging device 11 is detected to be low in the detection circuit 15. The video camera controls the charge accumulating time continuously in the imaging device 11 in the high shutter speed range in which the last discharge pulse SUB in situated in the vertical blanking period, that is when the object is light and the output level of the imaging device 11 is detected to be high in the detection circuit 15, for minutely controlling the charge accumulation time continuously in the high speed shutter range in which 1 H based control of the charge accumulating time is not practically useful. This results in the effects equivalent to those of opening and closing an iris. In other words, the function of automatic light exposure adjustment may be realized using an inexpensive manual iris lens, while cable connection between the main body of the video camera and the lens system may be eliminated, resulting in the reduced size of the main body of the video camera. Since the optimum light exposure may be preset in the main body of the video camera, readjustment need not be performed each time the exchange lens is exchanged.

A second embodiment of the solid-state imaging apparatus of the present invention will be explained by referring to FIG. 4 which is a block circuit diagram of a video camera making use of the second embodiment of the solid-state imaging apparatus.

The present video camera, provided with the above described function of automatic light exposure adjustment, is additionally so designed as to select desired fixed shutter speeds, such as 1/60, 1/100, 1/250 or 1/500 second.

Figure 4:
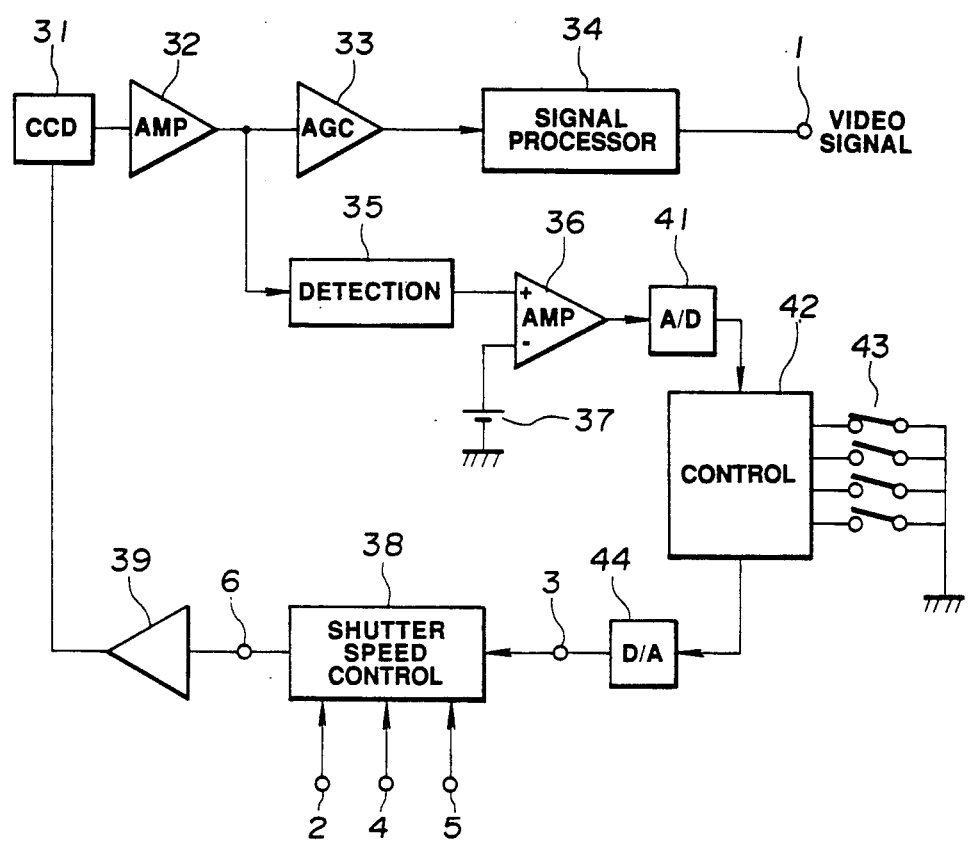
FIG. 4 is a block circuit diagram of a video camera making use of a solid-state imaging apparatus according to a second embodiment of the present invention.
Figure 5:
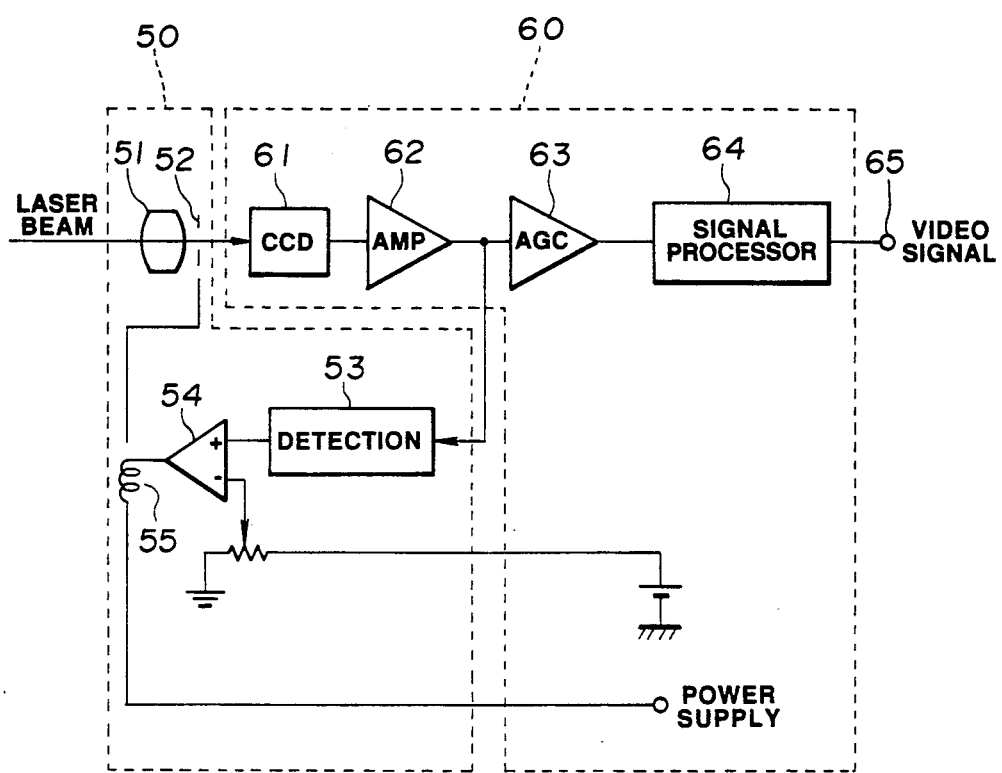
FIG. 5 is a block circuit diagram of a conventional video camera.

Turning to FIG. 4, the present video camera includes a solid-state imaging device 31, the charge accumulation time of which may be controlled, a signal processing circuit 34 adapted for converting the imaging signals from the solid-state imaging device 31 into video signals conforming to, for example, the NTSC system or PAL system, a detection circuit 35 for detecting the output level of the solid-state imaging device 31, and a shutter speed controlling circuit 38 for controlling the charge accumulating time of the solid-state imaging device 31 based on the output of the detection circuit 35. The video camera also includes a controlling circuit 42 for controlling the shutter speed controlling circuit 38 based on data supplied from a mode switch 43 adapted for setting the fixed shutter speed or the like for enabling the fixed shutter speeds to be selected as desired.

A CCD image sensor, the charge accumulating time of which may be controlled by the discharge pulse SUB supplied thereto, is used as the solid-state imaging device 31, similarly to the imaging device 11 shown in FIG. 1. The imaging signals from the solid-state imaging device 31 are amplified by an amplifier 32 before being supplied to an AGC circuit 33 for automatic gain control (AGC). The imaging signals from the AGC circuit 33 are supplied to the signal processing circuit 34 where they are converted into video signals conforming to, for example, the NTSC system or to the PAL system, before being outputted at the output terminal 1.

Similarly to the detection circuit 15, the detection circuit 35 detects the output level of the solid-state imaging device 31. The output of the detection circuit 35 is supplied to the differential amplifier 36.

The differential amplifier 36 compares the output level of the solid-state imaging device 31, detected by the detection circuit 35, to the reference voltage supplied from reference voltage generator 37, and transmits a difference, as a shutter controlling voltage, to an A/D converter 41. The difference converted into digital data is supplied as a shutter controlling voltage data to the controlling circuit 42.

The control circuit 42 is constituted by, for example, a microcomputer, is adapted to transmit the shutter controlling voltage data to a D/A converter 44 on the basis of the shutter controlling voltage data from the A/D converter 41 and data from the mode switch 43. More specifically, if the data from the mode switch 43 indicates an automatic light exposure adjustment mode, the controlling circuit 42 directly transmits the shutter controlling voltage data from the A/D converter 41 to the D/A converter 44. If the data from the mode switch 43 indicates data indicating the shutter speed of 1/100 s, the circuit 42 transmits shutter control voltage data corresponding to the shutter speed of 1/100 s to the D/A converter 44.

The data from the D/A converter 44 are converted by the D/A converter 44 into analog signals which are supplied as a shutter control voltage to the shutter speed controlling circuit 38.

Similarly to the shutter speed controlling circuit 18 shown in FIG. 1, the shutter speed controlling circuit 38 transmits discharge pulses to the imaging device 31 via driver circuit 39 based on the shutter control voltage from the D/A converter 44 to control the charge accumulation time in the imaging device 31, as described previously. The construction of the shutter speed controlling circuit 38 shown in FIG. 4 is similar to that shown in FIG. 2 and hence is not elucidated herein for brevity.

With the automatic light exposure adjustment mode, for example, the difference of the output level of the solid-state imaging device 31 from the reference voltage from the differential amplifier 36 is supplied as a shutter controlling voltage to the shutter speed controlling circuit 38 via A/D converter 41, controlling circuit 41 and D/A converter 44. In the low shutter speed range in which the object is dark and the output level of the solid-state imaging device 31 is detected to be low in the detection circuit 35, the shutter speed controlling circuit 38 transmits discharge pulses SUB, controlled on the 1H basis in accordance with the output level of the imaging device 31 during the imaging period, to the substrate of the solid-state imaging device 31 via driver circuit 39, thereby controlling the charge accumulation time in the imaging device 31 on the 1H basis. In the high shutter speed range in which the object is light and the output level of the solid-state imaging device 31 is detected to be high in the detection circuit 35, the shutter speed controlling circuit 38 transmits the discharge pulses SUB, continuously controlled during the vertical blanking period on the basis of the output level of the solid-state imaging device 31, to the substrate of the solid-state imaging device 31 via driver circuit 39, thereby continuously controlling the charge accumulation time of the solid-state imaging device 31.

During the fixed shutter speed mode, the shutter control voltage data from the controlling circuit 42, corresponding to the shouter speed of, for example, 1/100 s, are converted by D/A converter 44 into the shutter control voltage, which shutter control voltage, corresponding to the shutter speed of 1/100 s, is supplied to the shutter speed controlling circuit 38. The shutter speed controlling circuit 38 transmits the discharge pulse SUB, which will give the charge accumulating time of 1/100 s, to the substrate of the solid-state imaging device 31 via driver circuit 39.

In this manner, the imaging signals from the solid-state imaging device 31, controlled as to the charge accumulating time, that is, the imaging signals automatically adjusted for light exposure in accordance with lightness of the object, or the imaging signals having the charge accumulation time fixed at the desired shutter speed, are converted into video signals conforming to the NTSC or PAL system, as shown in FIG. 4, before being outputted at the terminal 1.

With the above described video camera, not only the function of automatic light exposure adjustment, as realized with the video camera of the preceding embodiment, is similarly realized, but desired fixed shutter speeds, such as 1/60, 1/100, 1/250 or 1/500 s, may be selected freely.

Although illustrative embodiments of the present invention, and various modifications thereof, have been described in detail herein with reference to the accompanying drawings, it is to be understood that the invention is not limited to these precise embodiments and the described modifications, and that various changes and further modifications, may be effected therein by one skilled in the art without departing from the scope or spirit of the invention as defined in the appended claims.

What is claimed is:

1. An imaging apparatus comprising:
   an imaging device for accumulating charge, discharging the accumulated charge in response to a discharge pulse, and producing an image output signal in response to an image output pulse;
   means for generating a voltage level based on said image output signal; and
   a shutter speed controlling circuit including: means for receiving a vertical scanning timing signal, means for receiving a reset pulse based on a horizontal scanning timing signal, means for receiving a vertical blanking pulse, means for generating a serrated pulse in response to said vertical scanning timing signal, means for generating a timing pulse by comparing said voltage level based on said image output signal of said imaging device with said serrated pulse, and means for generating said discharge pulse in response to said reset pulse, said vertical blanking pulse and said timing pulse so that a discharge of said imaging device is triggered by said reset pulse in a low shutter speed range in which completion of said timing pulse occurs outside of a duration of said vertical blanking pulse, and so that timing of said discharge is adjusted continuously in a high shutter speed range in which said completion of said timing pulse occurs within said duration of said vertical blanking pulse.

2. An imaging apparatus comprising:
an imaging device for accumulating charge, discharging the accumulated charge in response to a discharge pulse, and producing an image output signal in response to an image output pulse;
means for generating a voltage level based on said image output signal; and
a shutter speed controlling circuit including: means for receiving a vertical scanning timing signal, means for receiving a reset pulse based on a horizontal scanning timing signal, means for receiving a vertical blanking pulse, means for generating a serrated pulse in response to said vertical scanning timing signal, means for generating a timming pulse by comparing said voltage level based on said image output signal of said imaging device with said serrated pulse, and means for generating said discharge pulse including a first AND circuit for performing a logical AND of said timing pulse and said reset pulse, a second AND circuit for performing a logical AND of said timing pulse and said vertical blanking pulse, and an OR circuit for performing a logical OR of output signals of said first and second AND circuits so as to generate said discharge pulse so that a discharge of said imaging device is triggered by said reset pulse in a low shutter speed range in which a completion of said timing pulse occurs outside of a duration of said vertical blanking pulse, and so that timing of said discharge is adjusted continuously in a high shutter speed range in which said completion of said timing pulse occurs within said duration of said vertical blanking pulse.

* * * * *